United States Patent Office 3,029,152
Patented Apr. 10, 1962

3,029,152
OPTICAL GLASS
Alexander James Milne, St. Helens, and Richard John Parry, Rainhill, England, assignors to Pilkington Brothers Limited, Liverpool, England, a company of Great Britain
No Drawing. Filed Nov. 19, 1958, Ser. No. 774,850
Claims priority, application Great Britain Nov. 29, 1957
15 Claims. (Cl. 106—47)

This invention relates to optical glass and more particularly to optical glasses having high refractive indices and high $\mu$-values (Abbe values), and based on germanium oxide as their principal glass-forming constituent.

A main object of the present invention is to provide novel optical glasses based on germanium oxide and having a refractive index $n_d$ of from 1.80 to 1.94 and a $\mu$-value of from 32 to 43. By $n_d$ is meant the refractive index of the glass for the helium line (5876 A.), and by $\mu$-value, the ratio $n_d - 1/n_F - n_C$, where $n_F$ and $n_C$ are the refractive indices of the glass for the hydrogen blue (4861 A.) and red (6563 A.) lines respectively.

According to the present invention, there is provided an optical glass containing by weight from 20 to 50% germanium oxide $GeO_2$, from 30 to 50% lanthanum oxide $La_2O_3$, from 0 to 15% barium oxide BaO, from 0 to 10% boric oxide $B_2O_3$, from 0 to 30% tantalum oxide $Ta_2O_5$, and from 0 to 30% columbium oxide $Nb_2O_5$.

The optical glass according to the present invention can be made by fusion of batches containing the foregoing constituents in proportions which will give rise to a glass of the foregoing composition, followed by subsequent manipulation by normal optical glass making techniques. It is to be understood that it is convenient, as in common glass making practice, to express the composition of the glass in terms of the oxides of the various elements present, and that the materials used in the batch need not necessarily be oxides and may be other compounds which are converted to oxides during the melting process; for example it is convenient to use barium carbonate instead of barium oxide and boric acid instead of boric oxide.

The optical glass according to the invention may include small proportions of additional oxide constituents while still possessing the aforesaid optical properties. Accordingly, an optical glass made according to the present invention may include one or more of the following additional constituents, the oxides of lithium, sodium, potassium, magnesium, calcium, strontium, zinc, cadmium, silicon, titanium, zirconium, thorium, lead, aluminium, arsenic, and antimony, the total percentage of such additional oxide constituent or constituents not exceeding 20% by weight.

A preferred range of optical glasses within the scope of the present invention are those containing by weight from 20 to 32% germanium oxide $GeO_2$, from 35 to 43% lanthanum oxide $La_2O_3$, from 15 to 20% tantalum oxide $Ta_2O_5$, from 10 to 15% barium oxide BaO, and from 0 to 6% boric oxide $B_2O_3$. Optical glasses of this type have refractive indices $n_d$ of from 1.85 to 1.90 and $\mu$-values of from 33 to 40.

This preferred range of optical glasses according to the invention may also include small proportions of additional oxide constituents while still possessing the aforesaid optical properties. The additional constituents employed are preferably oxides of one or more of the following elements; lithium, sodium, potassium, calcium, strontium, zinc, titanium, aluminium, arsenic and antimony, the total amount of such aditional constituent or constituents being not more than 5% by weight.

The optical glass according to the invention may also, if desired, be tinted by the inclusion therein of suitable amounts of the appropriate colouring materials.

In order that the present invention may be more fully understood, there are listed in the following table, by way of illustration, preferred compositions and the respective optical properties of certain examples of optical glasses according to the invention, the proportions being percentages by weight.

| No. | $GeO_2$ | $La_2O_3$ | $Ta_2O_5$ | $Nb_2O_5$ | BaO | $B_2O_3$ | $n_d$ | $\gamma$ |
|---|---|---|---|---|---|---|---|---|
| 1 | 26.7 | 37.4 | 17.8 | | 13.8 | 4.3 | 1.855 | 38.9 |
| 2 | 46.9 | 48.7 | | | | 4.4 | 1.832 | 42.0 |
| 3 | 39.2 | 44.1 | | 14.7 | | 2.0 | 1.925 | 33.6 |
| 4 | 29.4 | 39.3 | 29.4 | | | 2.0 | 1.930 | 35.2 |
| 5 | 25.0 | 38.4 | 18.5 | | 13.8 | 4.3 | 1.859 | 38.7 |
| 6 | 24.1 | 39.7 | 18.4 | | 13.6 | 4.2 | 1.863 | 38.7 |
| 7 | 31.9 | 36.5 | 17.3 | | 13.4 | 0.9 | 1.865 | 37.6 |
| 8 | 22.4 | 42.3 | 17.9 | | 13.2 | 4.2 | 1.871 | 38.7 |
| 9 | 31.9 | 36.5 | 18.5 | | 12.2 | 0.9 | 1.878 | 37.0 |

| No. | $GeO_2$ | $La_2O_3$ | $B_2O_3$ | $SiO_2$ | $ZrO_2$ | $Al_2O_3$ | $ThO_2$ | ZnO | CaO | BaO |
|---|---|---|---|---|---|---|---|---|---|---|
| 10 | 30.5 | 40.5 | 8.7 | 1.7 | 2.6 | 4.2 | 9.1 | 1.1 | 0.5 | 1.1 |

Minor alterations in the percentage compositions of the above examples, within the scope of the invention, will, of course, produce corresponding minor differences in the optical properties of the resulting glass.

The following is given as a specific example of a manner of producing an optical glass as set forth in Example No. 1 above:

A glass batch having the composition:

26.7 gms. $GeO_2$
37.4 gms. $La_2O_3$
17.8 gms. $Ta_2O_5$
13.8 gms. BaO
4.3 gms. $B_2O_3$ was heated in a platinum crucible in an electric furnace at 1450° C. until the batch was completely fused. The batch was then stirred for half an hour in order to facilitate complete intermixing and reaction of the batch ingredients. In order to anneal the glass, the melt is cast into a mould previously heated to 650° C. and is cooled down slowly to room temperature at a rate of 1.5° C. per minute.

We claim:
1. An optical glass consisting essentially of by weight from 20 to 50% germanium oxide ($GeO_2$), from 30 to 50% lanthanum oxide ($La_2O_3$), and from 0.5 to 10% of boric oxide ($B_2O_3$), the glass having a refractive index ($n_d$) of from 1.80 to 1.94 and an Abbe value of from 32 to 43.

2. An optical glass consisting essentially of by weight from 20 to 50% germanium oxide ($GeO_2$), from 30 to 50% lanthanum oxide ($La_2O_3$), and from 0.5 to 6% of boric oxide ($B_2O_3$), the glass having a refractive index ($n_d$) of from 1.80 to 1.94 and an Abbe value of from 32 to 43.

3. An optical glass consisting essentially of by weight from 20 to 32% germanium oxide ($GeO_2$), from 35 to 43% lanthanum oxide ($La_2O_3$), from 0.5 to 6% boric oxide ($B_2O_3$), from 15 to 20% tantalum oxide ($Ta_2O_5$), and from 10to 15% of barium oxide (BaO), the glass having a refractive index ($n_d$) of from 1.85 to 1.90 and an Abbe value of from 33 to 4 0.

4. An optical glass according to claim 1, additionally containing an oxide of at least one of the elements selected from the group consisting of lithium, sodium, potassium, magnesium, calcium, strontium, zinc, cadmium, silicon, titanium, zirconium, thorium, lead, aluminium, arsenic and antimony, the total amount of such additional constituents being up to 20% by weight.

5. An optical glass according to claim 3, additionally containing an oxide of at least one of the elements selected from the group consisting of lithium, sodium, potassium, calcium, strontium, zinc, titanium, aluminium, arsenic, and antimony, the total amount of such additional constituents being up to 5% by weight.

6. An optical glass as set forth in claim 1 and containing by weight approximately 26.7% germanium oxide $GeO_2$, 37.4% lanthanum oxide $La_2O_3$, 17.8% tantalum oxide $Ta_2O_5$, 13.8% barium oxide BaO, and 4.3% boric oxide $B_2O_3$.

7. An optical glass as set forth in claim 1 and containing by weight approximately 46.9% germanium oxide $GeO_2$, 48.7% lanthanum oxide $La_2O_3$, and 4.4% boric oxide $B_2O_3$.

8. An optical glass as set forth in claim 1 and containing by weight approximately 39.2% germanium oxide $GeO_2$, 44.1% lanthanum oxide $La_2O_3$, 14.7% columbium oxide $Nb_2O_5$, and 2.0% boric oxide $B_2O_3$.

9. An optical glass as set forth in claim 1 and containing by weight approximately 29.4% germanium oxide $GeO_2$, 39.3% lanthanum oxide $La_2O_3$, 29.4% tantalum oxide $Ta_2O_5$, and 2.0% boric oxide $B_2O_3$.

10. An optical glass as set forth in claim 1 and containing by weight approximately 25.0% germanium oxide $GeO_2$, 38.4% lanthanum oxide $La_2O_3$, 18.5% tantalum oxide $Ta_2O_5$, 13.8% barium oxide BaO, and 4.3% boric oxide $B_2O_3$.

11. An optical glass as set forth in claim 1 and containing by weight approximately 24.1% germanium oxide $GeO_2$, 39.7% lanthanum oxide $La_2O_3$, 18.4% tantalum oxide $Ta_2O_5$, 13.6% barium oxide BaO and 4.2% boric acid $B_2O_3$.

12. An optical glass as set forth in claim 1 and containing by weight approximately 31.9% germanium oxide $GeO_2$, 36.5% lanthanum oxide $La_2O_3$, 17.3% tantalum oxide $Ta_2O_5$, 13.4% barium oxide BaO, and 0.9% boric oxide $B_2O_3$.

13. An optical glass as set forth in claim 1 and containing by weight approximately 22.4% germanium oxide $GeO_2$, 42.3% lanthanum oxide $La_2O_3$, 17.9% tantalum oxide $Ta_2O_5$, 13.2% barium oxide BaO, and 4.2% boric oxide $B_2O_3$.

14. An optical glass as set forth in claim 1 and containing by weight approximately 31.9% germanium oxide $GeO_2$, 36.5% lanthanum oxide $La_2O_3$, 18.5% tantalum oxide $Ta_2O_5$, 12.2% barium oxide BaO, and 0.9% boric oxide $B_2O_3$.

15. An optical glass as set forth in claim 1 and containing by weight approximately 30.5% germanium oxide $GeO_2$, 40.5% lanthanum oxide $La_2O_3$, 8.7% boric oxide $B_2O_3$, 1.7% silicon oxide $SiO_2$, 2.6% zirconium oxide $ZrO_2$, 4.2% aluminium oxide $Al_2O_3$, 9.1% thorium oxide $ThO_2$, 1.1% zinc oxide ZnO, 0.5% calcium oxide CaO, and 1.1% barium oxide BaO.

References Cited in the file of this patent

UNITED STATES PATENTS

| | | |
|---|---|---|
| 1,607,817 | Dennis | Nov. 23, 1926 |
| 2,206,081 | Eberlin | July 2, 1940 |
| 2,425,403 | Sun | Aug. 12, 1947 |
| 2,691,599 | Blou | Oct. 12, 1954 |
| 2,701,208 | Blou | Feb. 1, 1955 |

FOREIGN PATENTS

| | | |
|---|---|---|
| 725,206 | Great Britain | Mar. 2, 1955 |
| 722,329 | Germany | July 7, 1942 |

UNITED STATES PATENT OFFICE
CERTIFICATE OF CORRECTION

Patent No. 3,029,152 April 10, 1962

Alexander James Milne et al.

It is hereby certified that error appears in the above numbered patent requiring correction and that the said Letters Patent should read as corrected below.

Column 3, line 35, for "acid" read -- oxide --.

Signed and sealed this 28th day of August 1962.

(SEAL)
Attest:

ESTON G. JOHNSON
Attesting Officer

DAVID L. LADD
Commissioner of Patents